US006334213B1

(12) United States Patent
Li

(10) Patent No.: US 6,334,213 B1
(45) Date of Patent: *Dec. 25, 2001

(54) MERGING OF SEPARATE EXECUTABLE COMPUTER PROGRAMS TO FORM A SINGLE EXECUTABLE COMPUTER PROGRAM

(75) Inventor: Weijun Li, Mountain View, CA (US)

(73) Assignee: Preview Systems, Cupertino, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,842

(22) Filed: Jan. 20, 1998

(51) Int. Cl.[7] ..................................................... G06F 9/945

(52) U.S. Cl. ................................................................ 717/11

(58) Field of Search .............................. 395/712; 717/11, 717/4, 10, 9; 709/331

(56) References Cited

U.S. PATENT DOCUMENTS

| 5,193,180 | 3/1993 | Hastings ................................ 395/575 |
|---|---|---|
| 5,335,344 | 8/1994 | Hastings ................................ 395/575 |
| 5,341,429 | 8/1994 | Stringer et al. ......................... 380/23 |
| 5,359,659 | * 10/1994 | Rosenthal ................................. 380/4 |
| 5,456,691 | * 10/1995 | Snell ....................................... 607/30 |

(List continued on next page.)

FOREIGN PATENT DOCUMENTS

WO98/33106    7/1998   (WO).

OTHER PUBLICATIONS

Kath, Randy, "The Portable Executable File Format from Top to Botom" *Microsoft* (1993).

Pietrek, Matt, "Peering Inside the PE: A Tour of the Win32 Portable Executable File Format", *Microsoft* (1994).
Rubening, Neil J., "Infection Protection", *P.C. Magazine* (1989).
"Microsoft Portable Executable and Common Object File Format Specification 4.1", *Microsoft* (1994).

*Primary Examiner*—Mark R. Powell
*Assistant Examiner*—Wei Zhen
(74) *Attorney, Agent, or Firm*—Burns Doane Swecker & Mathis LLP

(57) ABSTRACT

The present invention, generally speaking, provides a method for modifying an original executable by injecting it with an injection executable, using a code injection utility. The original executable and the injection executable are of the same or compatible file formats, and the structure of both executables is either known in advance or ascertainable, i.e., by "dumping" and analyzing the contents of the executable. Preferably, the injection executable is a complete, self-contained executable written using standard development tools, such as a graphical, object-oriented development environment. In an exemplary embodiment, the code injection utility combines the original executable and the injection executable in such a way as to control execution of the original executable through prior execution of the injection executable. The user need only run the code injection utility, specify the names of the original executable and the injection executable, and specify the name of the new executable to be created. The code injection utility then automatically reads and analyzes the original executable and the injection executable, combines the original and injection executables in a predetermined fashion, and writes out a new executable. During the foregoing process, addresses are automatically adjusted as necessary. The execution pointer of the new executable points to code from the injection executable, and export entry points of the original executable are stored within and can only be obtained through code from the injection executable. Execution of code from the original executable is therefore entirely mediated by code from the injection executable.

17 Claims, 7 Drawing Sheets

U.S. PATENT DOCUMENTS

| | | | |
|---|---|---|---|
| 5,530,752 | 6/1996 | Rubin | 380/4 |
| 5,535,329 | 7/1996 | Hastings | 395/183.11 |
| 5,548,759 * | 8/1996 | Lipe | 707/100 |
| 5,673,315 | 9/1997 | Wolf | 380/4 |
| 5,768,597 * | 6/1998 | Simm | 395/712 |
| 5,812,828 * | 9/1998 | Kaufer et al. | 395/500.43 |
| 5,838,940 * | 11/1998 | Savkar et al. | 712/216 |
| 6,009,525 * | 12/1999 | Horstmann | 713/200 |
| 6,044,469 * | 3/2000 | Horstmann | 713/201 |
| 6,073,256 * | 6/2000 | Sesma | 714/38 |
| 6,141,698 * | 10/2000 | Krishnan et al. | 709/331 |

\* cited by examiner

```
typedef struct _IMAGE_FILE_HEADER {
    USHORT  Machine;
    USHORT  NumberOfSections;
    ULONG   TimeDateStamp;
    ULONG   PointerToSymbolTable;
    ULONG   NumberOfSymbols;
    USHORT  SizeOfOptionalHeader;
    USHORT  Characteristics;
} IMAGE_FILE_HEADER, *PIMAGE_FILE_HEADER;

#define IMAGE_SIZEOF_FILE_HEADER            20
```

FIG. 2
PRIOR ART

```
typedef struct _IMAGE_OPTIONAL_HEADER {
    //
    // Standard fields.
    //
    USHORT  Magic;
    UCHAR   MajorLinkerVersion;
    UCHAR   MinorLinkerVersion;
    ULONG   SizeOfCode;
    ULONG   SizeOfInitializedData;
    ULONG   SizeOfUninitializedData;
    ULONG   AddressOfEntryPoint;
    ULONG   BaseOfCode;
    ULONG   BaseOfData;
    //
    // NT additional fields.
    //
    ULONG   ImageBase;
    ULONG   SectionAlignment;
    ULONG   FileAlignment;
    USHORT  MajorOperatingSystemVersion;
    USHORT  MinorOperatingSystemVersion;
    USHORT  MajorImageVersion;
    USHORT  MinorImageVersion;
    USHORT  MajorSubsystemVersion;
    USHORT  MinorSubsystemVersion;
    ULONG   Reserved1;
    ULONG   SizeOfImage;
    ULONG   SizeOfHeaders;
    ULONG   CheckSum;
    USHORT  Subsystem;
    USHORT  DllCharacteristics;
    ULONG   SizeOfStackReserve;
    ULONG   SizeOfStackCommit;
    ULONG   SizeOfHeapReserve;
    ULONG   SizeOfHeapCommit;
    ULONG   LoaderFlags;
    ULONG   NumberOfRvaAndSizes;
    IMAGE_DATA_DIRECTORY DataDirectory[IMAGE_NUMBEROF_DIRECTORY_ENTRIES];
} IMAGE_OPTIONAL_HEADER, *PIMAGE_OPTIONAL_HEADER;
```

FIG. 3
PRIOR ART

```
define IMAGE_SIZEOF_SHORT_NAME                    8 typedef struct _IMAGE_SECTION_HEADER {
    UCHAR    Name[IMAGE_SIZEOF_SHORT_NAME];
    union {
            ULONG    PhysicalAddress;
            ULONG    VirtualSize;
    } Misc;
    ULONG    VirtualAddress;
    ULONG    SizeOfRawData;
    ULONG    PointerToRawData;
    ULONG    PointerToRelocations;
    ULONG    PointerToLinenumbers;
    USHORT   NumberOfRelocations;
    USHORT   NumberOfLinenumbers;
    ULONG    Characteristics;
} IMAGE_SECTION_HEADER, *PIMAGE_SECTION_HEADER;
```

FIG. 4
PRIOR ART

| Value | Definition |
|---|---|
| 0X00000020 | Code section |
| 0X00000040 | Initialized data section |
| 0X00000080 | Uninitialized data section |
| 0X04000000 | Section cannot be cached |
| 0X08000000 | Section is not pageable |
| 0X10000000 | Section is shared |
| 0X20000000 | Executable section |
| 0X40000000 | Readable section |
| 0X80000000 | Writable section |

FIG. 5
PRIOR ART

```
typedef struct _IMAGE_RESOURCE_DATA_ENTRY {
    ULONG    OffsetToData;
    ULONG    Size;
    ULONG    CodePage;
    ULONG    Reserved;
} IMAGE_RESOURCE_DATA_ENTRY, *PIMAGE_RESOURCE_DATA_ENTRY;
```

```
typedef struct _IMAGE_EXPORT_DIRECTORY {
    ULONG   Characteristics;
    ULONG   TimeDateStamp;
    USHORT  MajorVersion;
    USHORT  MinorVersion;
    ULONG   Name;
    ULONG   Base;
    ULONG   NumberOfFunctions;
    ULONG   NumberOfNames;
    PULONG  *AddressOfFunctions;
    PULONG  *AddressOfNames;
    PUSHORT *AddressOfNameOrdinals;
} IMAGE_EXPORT_DIRECTORY, *PIMAGE_EXPORT_DIRECTORY;
```

FIG. 8
PRIOR ART

```
E6A7 0000 F6A7 0000    08A8 0000 1AA8 0000    ................
28A8 0000 3CA8 0000    4CA8 0000 0000 0000    (...<...L.......
0000 4765 744F 7065    6E46 696C 654E 616D    ..GetOpenFileNam
6541 0000 636F 6D64    6C67 3332 2E64 6C6C    eA..comdlg32.dll
0000 2500 4372 6561    7465 466F 6E74 496E    ..%.CreateFontIn
6469 7265 6374 4100    4744 4933 322E 646C    directA.GDI32.dl
6C00 A000 4765 7444    6576 6963 6543 6170    l...GetDeviceCap
7300 C600 4765 7453    746F 636B 4F62 6A65    s...GetStockObje
6374 0000 D500 4765    7454 6578 744D 6574    ct....GetTextMet
7269 6373 4100 1001    5365 6C65 6374 4F62    ricsA...SelectOb
6A65 6374 0000 1601    5365 7442 6B43 6F6C    ject....SetBkCol
6F72 0000 3501 5365    7454 6578 7443 6F6C    or..5.SetTextCol
6F72 0000 4501 5465    7874 4F75 7441 0000    or..E.TextOutA..
```

FIG. 9
PRIOR ART

MERGING OF SEPARATE EXECUTABLE COMPUTER PROGRAMS TO FORM A SINGLE EXECUTABLE COMPUTER PROGRAM

BACKGROUND OF THE INVENTION

1. Field of the Invention

The present invention relates to the modification of executable computer programs.

2. State of the Art

Many instances arise in which it is desirable to modify the behavior of an executable computer program. Such modifications may of course be made using the program source code, by writing additional source code and performing another program build to create a derivative executable computer program. Often, however, it is desirable to modify the behavior of an executable computer program using only the executable code, or object code, also referred to as the executable image. One instance in which such modification is performed is in program monitoring, or profiling, as described in U.S. Pat. Nos. 5,193,180 and 5,335,344, incorporated herein by reference. In the modification method described in the foregoing patents, however, new instructions and new data are interspersed with old code and old data in accordance with a detailed control program. The control program requires detailed, instruction-level knowledge of the executable program. Specification of what instructions and what data are to be add where is a painstaking process that is difficult to automate.

Object code modification unavoidably requires a detailed knowledge of the file format of the executable file to be modified. One prevalent file format is the Common Object File Format (COFF), common to both the Unix and PC worlds. A newer format, the roots of which may be traced back to COFF, is the Windows NT™ Portable Executable (PE) format. Current Windows programs are typically of this format. The present invention will therefore be described, in an exemplary embodiment, with reference to the PE format. To enable an understanding of the present invention, the PE format will be described in considerable detail. (The PE format is publicly documented, for example in the Microsoft Developers Network (MSDN) CD-ROM, as well as on the MSDN Web site, at http://premium.microsoft.com/msdn/library/techart/pefile.htm and elsewhere.) The principles of the invention, however, are applicable to various file formats commonly used on various hardware platforms (Windows, Unix, Macintosh, etc.).

Referring to FIG. 1, the PE format calls for an executable to have a code section, a data section, and a resource section. All code segments are combined into a single section. The data section may contain different types of data, including, for example, an import data (.idata) and export data (.edata). (The location of various types of information within the executable is set forth in the data directory of the PE optional header, described below.) The executable may also have other optional sections, for example a relocation section. Although the foregoing arrangement is typical, A header portion of a PE executable includes a PE file header, a PE file "optional" header (required), and a section table header. Finally, the PE executable includes an MS-DOS stub program. (This stub runs under DOS and typically just informs the user that the main program is not a DOS program and cannot be run under DOS.)

Referring to FIG. 2, the structure of the PE file header is shown. The PE file header is of fixed size and contains high-level information used by the system or application to determine how to treat the file. The NumberOfSections field indicates how many section headers and section bodies the executable contains and may be used to extract information from the executable. The section headers are laid out sequentially in the section header table, and the corresponding section bodies are laid out sequentially following the section header table.

Referring to FIG. 3, the optional PE header contains most of the meaningful information about the executable image. The standard fields have the same names as corresponding fields in COFF. The AddressOfEntryPoint field indicates the location of the entry point for the application within the code section. Immediately preceding the module entry point within the code section is an Import Address Table (IAT), a series of jump instructions and associated virtual jump-to addresses that, during loading of the executable by the operating system, are "fixed-up" to contain physical addresses of imported functions that may be called by the module.

The additional (non-COFF) fields provide loader support for the operating system. The linageBase field specifies the preferred base address in the address space of a process to map the executable image to. (In the case of a Windows C++ compiler, the default value for executables is 0x00400000; DLLs must use a different address.) The FileAlignment field dictates the minimum size of section bodies within the image file prior to loading, whereas the SectionAlignment field dictates the minimum amount of space a section can occupy when loaded. The SizeOfImage field is obtained by determining how many bytes each section requires, rounding to the nearest page boundary, rounding the page count to the nearest Section Alignment boundary, and forming the sum total of each sections's individual requirement. The SizeOfHeaders field indicates the total size of the header portion of the file, or where the section bodies begin in the file.

Located at the end of the optional header structure is an array of data directory location entries, indicating where to find other important components of executable information in the file. Including in the directory location entries array are entries for an export directory, an import directory, a resource directory, a base relocation directory, etc., corresponding to predefined sections of the executable. The field NumberOfRvaAndSizes identifies the length of the data directory array. Each data directory location entry specifies the size and relative virtual address of a directory located within a corresponding section. Typically, a data directory is the first structure within the section body.

Referring to FIG. 4, section headers are of fixed length. The VirtualAddress field identifies the virtual address in the process's address space to which to load the section. The actual address is created by taking the value of this field and adding it to the ImageBase virtual address in the optional header structure. (However, if the image file is a Dynamic Link Library component, or DLL, it may be loaded to a location different than the requested location, necessitating relocation.) The SizeOfRawData field indicates the size of the section body to the next nearest FileAlignment-sized increment. Once the image is loaded into a process's address space, the size of the section body becomes less than or equal to a multiple of SectionAlignment. The characteristics, or attributes, field defines the section characteristics as shown in FIG. 5.

Of the predefined sections, the most complex is the resource section. Resources may include such things as cursors, bitmaps, icons, menus, dialogs, strings, fonts, etc. Referring to FIG. 6, a simple resource tree structure is shown. At the root of the tree is type directory having one entry for each type of resource the file contains (regardless of how many resources of each type it contains). In the example of FIG. 6, one type entry might be for menus and the other type entry for string tables. Each of the entries in the root-level type directory points to a sibling node in the second level of the tree. These nodes are directories also, used to identify the name of each resource within a given type. For an application having multiple menus defined, for example, there would be an entry for each one at the second level of the tree. Resources can be identified by name or by integer. If by name, the Name field is used to point to a name structure containing the name in Unicode, for example. Otherwise, the Name field represents the integer ID of the resource.

Level three of the tree structure maps a one-to-one correspondence between the individually identified resources and their respective language IDs. For example, the value 0x09 designates English as the primary language. Each level three node points to a leaf node containing an image resource data entry structure of a type shown in FIG. 7.

Of the various data sections, most relevant to the present invention are the export data section (.edata) and the import data section (.idata). Functions may be "exported" from a module by "publishing" a list of exported function entry points. The export data section includes a image export directory structure of a type shown in FIG. 8. The AddressOfFunctios field is an offset to a list of exported function entry points. The AddressOfNames field is the address of an offset to the beginning of a null-separated list of exported function names. The AddressOfNameOrdinals is an offset to a list of ordinal values for the same exported functions. The three Address fields are relative virtual addresses into the address space of a process once the module has been loaded. Before the file is loaded, the address can be determined by subtracting the section header virtual address (VirtualAddress) from the given field address, adding the section body offset (PointerToRawData) to the result, and then using this value as an offset into the image file.

Similarly, a module may "import" a function from another module. The module and function names of all imported modules are listed in the idata section data. The function names and module names to which they belong are ordered such that a function name appears first, followed by the module name and then by the rest of the function names, if any, as shown in FIG. 9.

SUMMARY OF THE INVENTION

The present invention, generally speaking, provides a method for modifying an original executable by injecting it with an injection executable, using a code injection utility. The original executable and the injection executable are of the same or compatible file formats, and the structure of both executables is either known in advance or ascertainable, i.e., by "dumping" and analyzing the contents of the executable. Preferably, the injection executable is a complete, self-contained executable written using standard development tools, such as a graphical, object-oriented development environment. In an exemplary embodiment, the code injection utility combines the original executable and the injection executable in such a way as to control execution of the original executable through prior execution of the injection executable. The user need only run the code injection utility, specify the names of the original executable and the injection executable, and specify the name of the new executable to be created. The code injection utility then automatically reads and analyzes the original executable and the injection executable, combines the original and injection executables in a predetermined fashion, and writes out a new executable. During the foregoing process, addresses are automatically adjusted as necessary. The execution pointer of the new executable points to code from the injection executable, and export entry points of the original executable are stored within and can only be obtained through code from the injection executable. Execution of code from the original executable is therefore entirely mediated by code from the injection executable. Furthermore, in an exemplary embodiment, code from the original executable is compressed and stored on disk within a section of the injection executable. Absent knowledge of the particulars of the cornpression mechanism employed, the code from the original executable cannot be extracted. When the new executable is executed, code from the injection executable controls execution of code from the original executable. If the conditions for execution of code from the original executable are satisfied, code from the injection executable decompresses the code from the original executable from disk and loads it into memory locations previously reserved for this purpose. From this point, execution of the new executable is preferably indistinguishable to a user from execution of the original executable. A simple, highly-effective software protection mechanism therefore results.

BRIEF DESCRIPTION OF THE DRAWING

The present invention may be further understood from the following description in conjunction with the appended drawing. In the drawing:

FIG. 2 illustrates the structure of the PE header;

FIG. 3 illustrates the structure of the optional PE header;

FIG. 4 illustrates the structure of a section header;

FIG. 5 is a table listing characteristics definitions for a section;

FIG. 8 illustrates the structure of an image export directory;

FIG. 9 illustrates a dump of the idata section of a sample application;

DETAILED DESCRIPTION OF THE PREFERRED EMBODIMENTS

Figure 1:
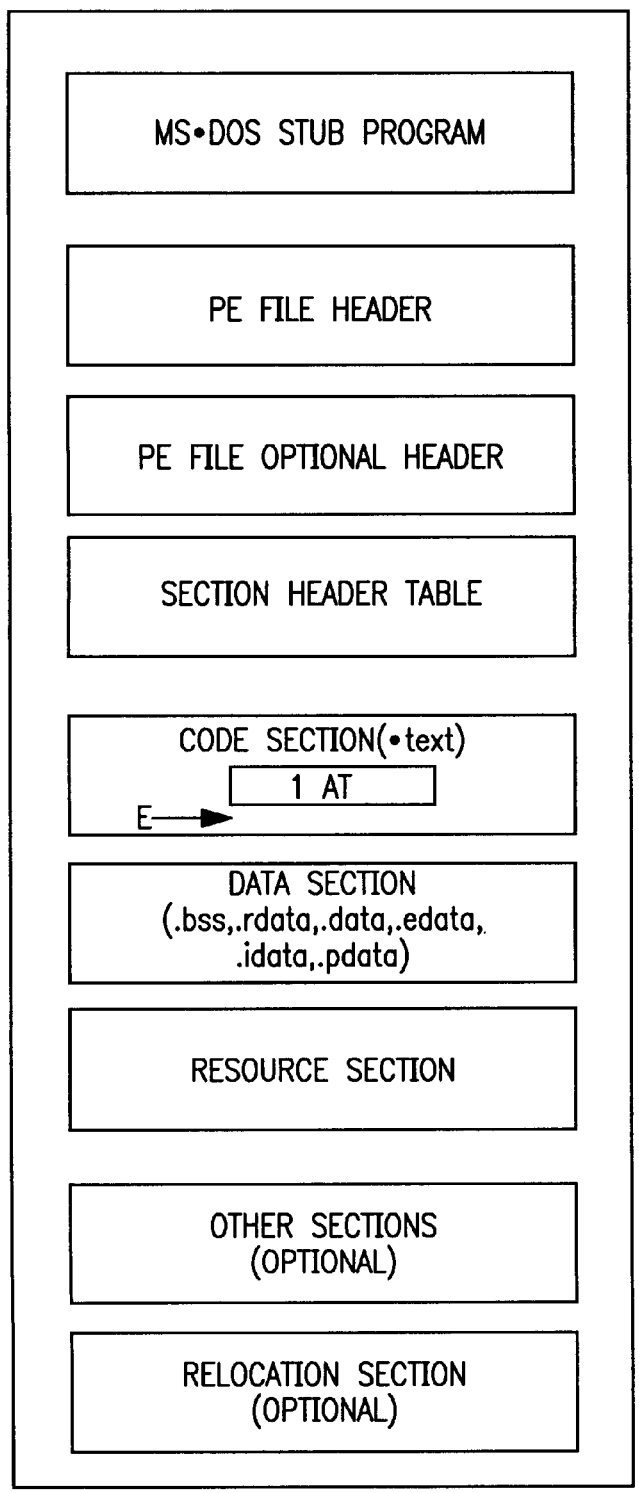
FIG. 1 is a diagram of the structure of a conventional executable file (PE format)
Figures 6, 7:
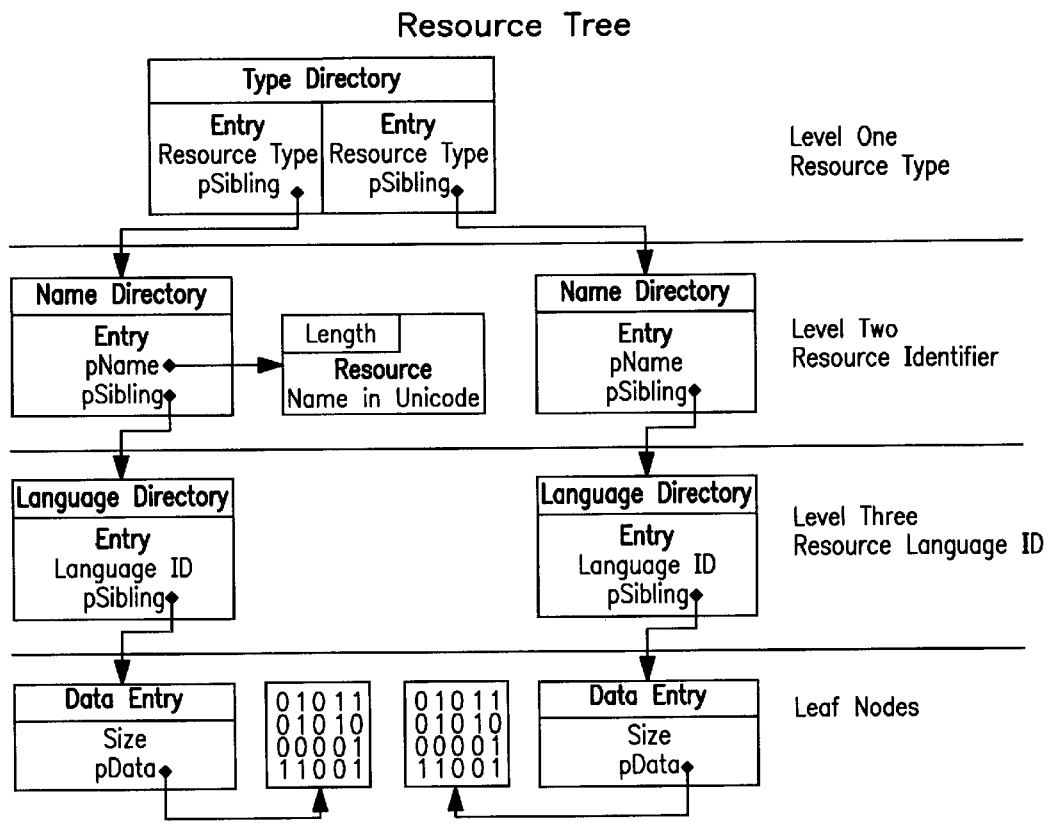
FIG. 6 is a diagram of a simple resource tree structure.
FIG. 7 illustrates the structure of an image resource data entry.
Figure 10:
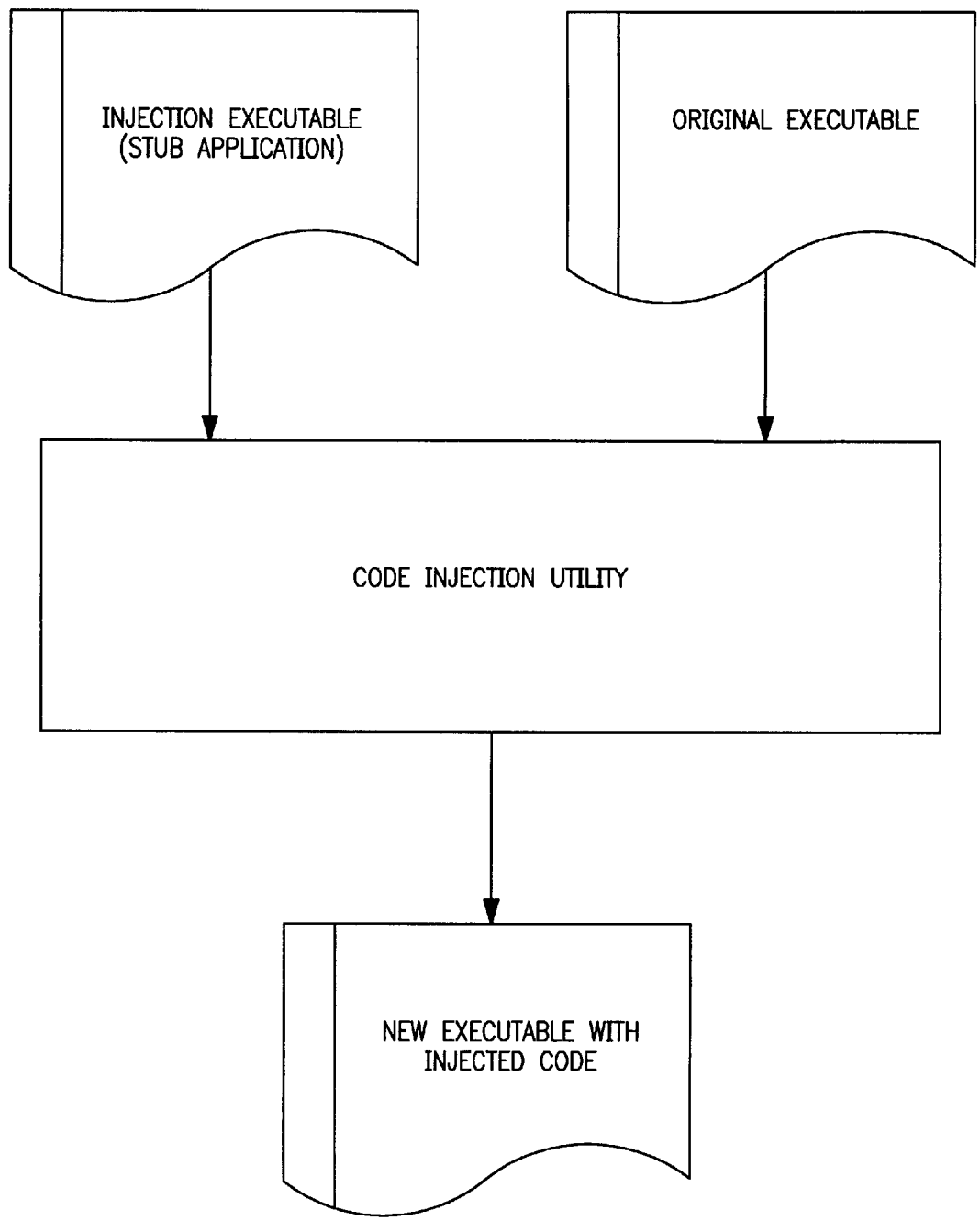
FIG. 10 is a flow diagram of a process for combining two executable programs in accordance with the present invention.

Referring now to FIG. 10, a generalized flow diagram is shown of a process for combining to executable programs, an original executable and an injection executable, in accordance with an exemplary embodiment of the invention. A code injection utility (application injection/link program) is used to "inject" the original application with the injection executable to produce an injected executable including code of both executables.

Code injection provides a general method to inject an executable application file, or stub program (e.g., a Windows executable such as a PE file or NE (Windows 3.X) file or a non-Windows executable) into an existing compatible executable file and generate a new application executable. When the new executable runs, the injection executable will be executed first and will determine whether or not to execute the original executable. The generated application can be encrypted or compressed. The injection executable can be any compatible application with any desired function, e.g.: (1) a program that protects and encrypts an application, preventing unauthorized use of the application, or that provides anti-virus capabilities; (2) a program that has some electronic commerce function, such as enabling the application to be used to do a purchase via the Internet.

Code injection has three levels of complexity. The first level of complexity is the physical combination of the two executables. Most operating systems, such as the Windows operating system, initialize an executable by reading various information from sections of the executable and writing information into tables used by the operating system. Such initialization is performed only once. Unless the executables are properly combined in the new executable, the new executable can cause system crashes.

The second level of complexity is ensuring that code from the injection executable is given complete control over execution of code from the original executable. Code of an executable can be executed in two ways: statically (the executable can be launched and run) and dynamically by calling exported functions of the executable. Code from the injection executable must mediate both kinds of execution.

The third level of complexity involves optionally encrypting or compressing the code from the original application to prevent the foregoing control mechanism from being cracked or hacked. Code from the injection executable must be able to undo such encryption or compression completely such that when code from the original executable is executed, no ill-effects of the code from the injection executable are apparent. During the following description of a PELink portion of the code injection utility, the manner in which these three levels of complexity are dealt with will be described.

Prior to running the PELink portion of the code injection utility, however, the code injection utility must have a detailed knowledge of the particulars of the original executable and the injection executable. Because the code injection utility is meant to be general-purpose, the original executable may be any executable of a format understood by the code injection utility, e.g., the PE format. To obtain detailed knowledge of the original executable, selected portions of the original executable (e.g., the PE header and optional header, the section table, the directories) are read and analyzed, and the contents of the application are "dumped," producing results of a type set forth in the following Appendix. The process of dumping the contents of an executable is well-known in the art, and various utilities are available to accomplish the same. The injection executable may also be read in and dumped. Alternatively, the injection executable may be required to follow certain rules, i.e., that it be written using a known version of a known development tool (e.g., the Visual C++5.X development tool), that it have only certain sections specified in advance, etc.

Figure 11:
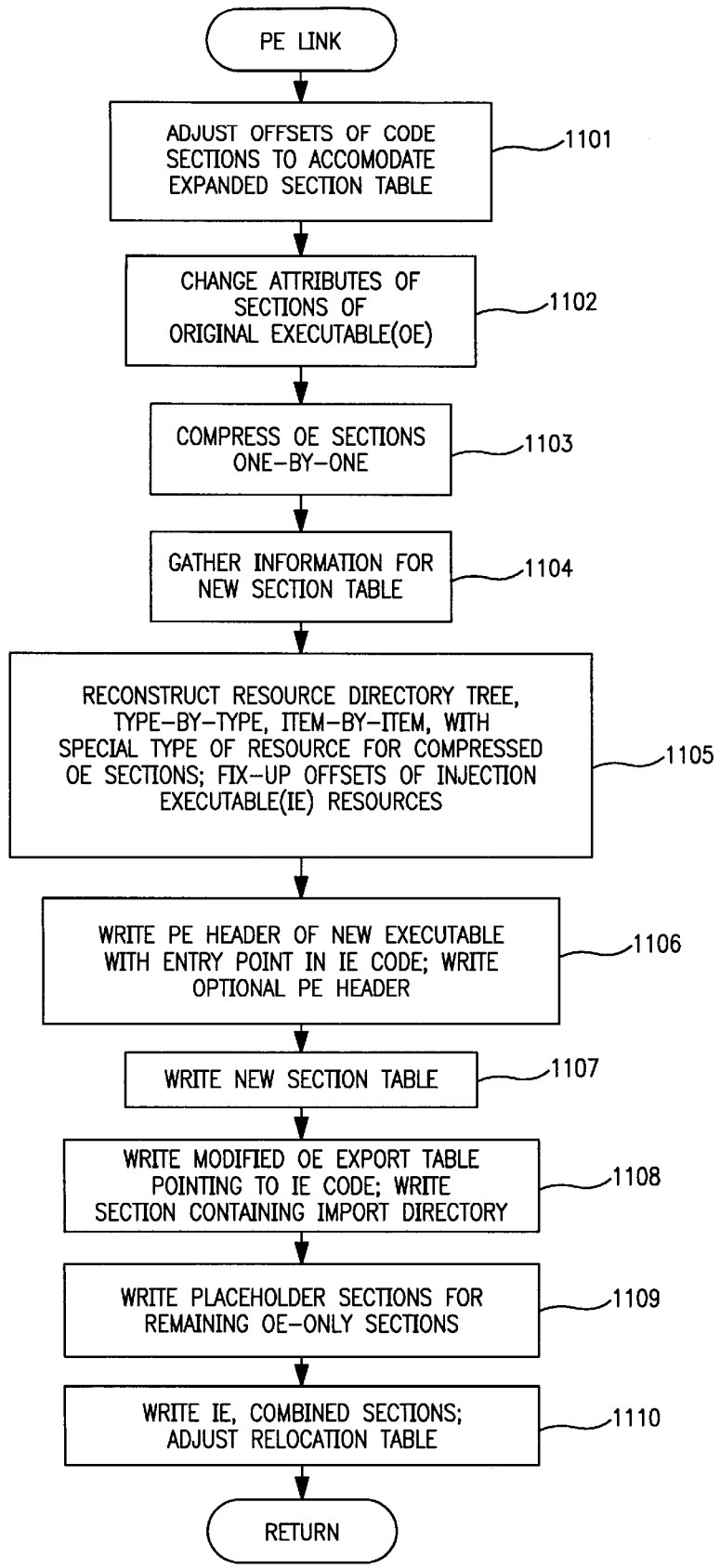
FIG. 11 is a flow diagram of a PELink process of the present code injection utility.

Assuming that the structures of the original executable and the injection executable have been ascertained, if necessary, the PELink portion of the code injection utility may then proceed. The following description assumes that a compression option has been set. Referring to FIG. 11, the first step is to determine a new offset for where the section bodies will begin in the new executable. In other words, the section bodies must be moved backwards, from the viewpoint of the original application, to reserve enough space for the new section table. Offsets of all of the sections of the injection executable are adjusted accordingly. (Step 1101. The length of the header portion of the executable prior to the section table is fixed and therefore does not affect the offset.)

In Step 1103, the attributes (characteristics) of all of the sections to be compressed are changed to writeable Otherwise, when code from the injection executable attempts to restore the sections, the operation system will not allow them to be written. In the case of Windows NT, the section in which the import table is found (.idata) is also changed to writable. Next, the sections of the original executable are read and compressed one-by-one to temporary files (Step 1107). (The section in which the import directory is found, however, is not compressed, as some operating systems (i.e., Windows) will attempt to write information there; nor is the seetion compressed in which the export table—if any—is found, but the export table is modified as described below.) The compressed length of each of the sections is determined, allowing information for a new section table to be gathered and stored in an internal data structure of the code injection utility (step 1109).

Then, the resource directory is reconstructed, type-by-type and item-by-item, to account for the combined resource items of the original executable and the injection executable (Step 1111). (Care must be taken to avoid item ID conflicts between the original executable and the injection executable. In an exemplary embodiment, conflicts are avoided by the injection executable using strings instead of numeric values for item IDs.) In the new executable, the resource items of the injection executable will immediately follow the resource items of the original executable. The offsets of the resource items of the injection executable must therefore be "fixed-up." Resources of the injection executable include a special type of resource used to hold the compressed image of a section of the original executable. The new resource section will store all of the compressed sections of the original executable. The number and sizes of the compressed section images from the preceding compression step are therefore used to construct the new resource directory.

Within the disk file of the new executable, the raw data sizes of the compressed sections of the old executable will be set to zero, but their virtual sizes and virtual addresses will be maintained so as to reserve for each section the same amount of memory space it occupied within the original executable thereby forming "placeholder" sections. When the new executable is loaded by the operating system, it allocate address space for the sections of the original executable but doesn't put anything there. When code from the injection executable runs (prior to any code from the original executable), if the proper conditions arc fulfilled, it functions as an auxiliary loader by finding the special resource items containing the compressed sections of the original executable, expanding them, and loading them into memory where the operating system has reserved space. Thus code from the injection executable is able to undo the compression completely such that when code from the original executable is executed, no ill-effects of the code from the injection executable are apparent.

All compressed data is stored within a particular type of resource and, at run-time, loaded from the particular resource and restored to its original address. Because the sections of the original executable are compressed within the resource section, they cannot be located or retrieved without extraordinary effort.

Combination of the resource sections of the original executable and the injection executable is complicated due to the resource directory tree structure. Other sections of the original executable and the injection executable are also cornbined, including the import data sections and the relocation sections. In large measure, simple concatenation suffices in order to combine these sections.

At this point, the code injection utility is ready to write out the new executable. New PE and optional PE headers are written (Step 1113), reflecting the changed structure and attributes of the new executable, and telling the size of the code and data sections. Included in the new optional PE header is a new data directory. A new section table is also written (Step 1115).

As previously mentioned, it is important that code from the injection executable obtain full control over the new executable. This is achieved in part by modifying the entry point within the PE header to point to code from the injection executable. To obtain full control, however, the export entry points of the original executable (if any) must be protected. Hence, if the original executable has an export table, a new export table is formed within the code section of the injection executable. The entry points of the original executable are redirected into the code section of the injection executable (Step 1117), where, for each entry point, the injection executable causes a jump to the corresponding original entry point to be performed only if the appropriate conditions have been satisfied. In an exemplary embodiment, the instruction sequence at the redirected entry point within the new export table first causes an authentication function to be performed. If this function determines that code from the original executable is to be permitted to run, the a decompression function is called, causing code from the original executable to be decompressed and loaded into memory in accordance with the original memory map of the original executable. Finally, a jump is performed to the old entry point within the code from the original executable.

The final step is to write the sections to the new executable one-by-one. The sections of the original executable (with the exception of those containing the import directory and the export table) are written as placeholder sections with the raw data size specified to be zero such that during loading of the new application space is reserved for these sections but not filled (Step 1119). The sections of the injection executable are written in the normal fashion (Step 1121), as are the sections of the original executable containing the import directory and the export table. Entries within a relocation table of the injection executable are adjusted in accordance with a preferred base address of the original executable, and the relocation table is combined with a relocation table of the original executable (if any).

If desired, the sections of the original executable may be written with all information other than the import directory itself and the export table itself zeroed out, to afford greater protection of the code of the original executable, and these sections may be stored in their entirety in compressed form within the resource section in like manner as other sections of the original executable. When code from the injection executable is run, if access to the original executable is allowed, then the sections of the original executable containing the import directory and the export table may be decompressed and written over the corresponding sections previously loaded into memory.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of modifying an original executable including a code section, a data section and a resource section by injecting it with an injection executable also including a code section, a data section and a resource section so as to control execution of the original executable through prior execution of the injection executable, the method comprising the steps of:

specifying the name of the original executable;

specifying the name of the injection executable;

reading and analyzing at least the original executable;

combining at least one section of the original executable with a corresponding section of the injection executable;

writing a new executable including code of the original executable and code of the injection executable, and including a placeholder section corresponding to a section of the original executable, and including a modified header, the modified header causing code of the injection executable to be executed prior to execution of any code of the original executable; and writing information from said section of the original executable in a different section of the new executable;

wherein the injection executable controls execution of the new executable.

2. The method of claim 1, wherein the different section of the new executable is a resource section.

3. The method of claim 2, wherein information from multiple sections of the original executable is stored in the resource section of the new executable.

4. The method of claim 3, wherein said multiple sections include a code section and a resource section.

5. The method of claim 4, wherein said multiple sections further include a data section.

6. The method of claim 1, comprising the further step of compressing or encrypting information from said section of the original executable.

7. The method of claim 1, wherein the new executable includes code from the injection executable for loading information from said section of the original executable into computer memory at a location indicated by said placeholder section.

8. A method of modifying an original executable including a code section, a data section and a resource section by injecting it with an injection executable also including a code section, a data section and a resource section so as to control execution of the original executable through prior execution of the injection executable, the method comprising the steps of:

writing a new executable in which at least one section of the original executable is stored within a different, non-corresponding section of the new executable;

including instructions to reserve within memory space for said one section of the original executable; and upon executing the new executable, first executing code from the injection executable, said code from the injection executable loading said one section of the original executable into memory and causing execution of said one section of the original executable.

9. The method of claim 8, wherein said non-corresponding section of the new executable is a resource section.

10. The method of claim 9, wherein information from multiple sections of the original executable is stored in the resource section of the new executable.

11. The method of claim 10, wherein said multiple sections include a code section and a resource section.

12. The method of claim 11, wherein said multiple sections further include a data section.

13. The method of claim 8, comprising the further step of compressing or encrypting information from said at least one section of the original executable.

14. The method of claim 13, wherein the new executable includes code from the injection executable for loading information from said section of the original executable into computer memory.

15. The method of claim 8, comprising the further steps of including within a section from the injection executable information corresponding to an export table of the original executable, and modifying an export table of the new executable to point to a section of the original executable.

16. A computer-readable medium including program instructions for modifying an original executable including a code section, a data section and a resource section by injecting it with an injection executable also including a code section, a data section and a resource section so as to control execution of the original executable through prior execution of the injection executable, said instructions including instructions for:

inputting the name of the original executable;

inputting the name of the injection executable;

reading and analyzing at least the original executable;

combining at least one section of the original executable with a corresponding section of the injection executable;

writing a new executable including code of the original executable and code of the injection executable, and including a placeholder section corresponding to a section of the original executable, and including a modified header, the modified header causing code of the injection executable to be executed prior to execution of any code of the original executable; and writing information from said section of the original executable in a different section of the new executable;

wherein the injection executable controls execution of the new executable.

17. A computer-readable meadium containing program instructions for modifying an original executable including a code section, a data section and a resource section by injecting it with an injection executable also including a code section, a data section and a resource section so as to control execution of the original executable through prior execution of the injection executable, said instructions including instructions for:

writing a new executable in which at least one section of the original application is stored within a different, non-corresponding section of the new executable;

reserving within memory space for said one section of the original executable; and upon executing the new executable, first executing code from the injection executable, said code from the injection executable loading said one section of the original executable into memory and causing execution of said one section of the original executable.

* * * * *